US007685700B2

(12) United States Patent
Dehlke et al.

(10) Patent No.: US 7,685,700 B2
(45) Date of Patent: Mar. 30, 2010

(54) COMPENSATING UNIT FOR A TOOL UNIT AND METHOD FOR INSERTING AN ELEMENT INTO A WORKPIECE

(75) Inventors: Klaus Dehlke, Windsbach (DE); Christian Böhner, Burghaslach (DE); Gerd Hartrampf, Abenberg (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 167 days.

(21) Appl. No.: 11/820,149

(22) Filed: Jun. 18, 2007

(65) Prior Publication Data

US 2008/0005885 A1 Jan. 10, 2008

Related U.S. Application Data

(63) Continuation of application No. PCT/EP2005/010209, filed on Sep. 21, 2005.

(30) Foreign Application Priority Data

Dec. 16, 2004 (DE) .................. 10 2004 061 164
May 13, 2005 (DE) .................. 10 2005 023 099

(51) Int. Cl.
*B23Q 3/00* (2006.01)
*B23P 21/00* (2006.01)
*B23Q 15/00* (2006.01)

(52) U.S. Cl. ................... 29/709; 29/468; 29/407.09; 29/407.1; 29/714; 33/626; 901/45; 403/59; 403/13

(58) Field of Classification Search ............ 29/709, 29/714, 468, 407.01, 407.09, 407.1, 464, 29/525.01; 901/45, 41; 403/13, 14, 49; 483/34, 483/901, 19, 31; 33/626, 644
See application file for complete search history.

(56) References Cited

U.S. PATENT DOCUMENTS

| 4,517,744 | A | * | 5/1985 | Consales et al. | ............. 33/644 |
| 4,661,037 | A | * | 4/1987 | Sugino et al. | ............. 414/729 |
| 4,801,240 | A | * | 1/1989 | Hautau et al. | ............. 414/735 |
| 4,820,114 | A | * | 4/1989 | Inaba et al. | ............. 414/751.1 |
| 4,863,206 | A | | 9/1989 | Kaufmann | |
| 4,954,005 | A | * | 9/1990 | Knasel et al. | ............. 403/57 |
| 5,271,686 | A | | 12/1993 | Herring, Jr. et al. | |
| 5,312,212 | A | * | 5/1994 | Naumec | ............. 409/138 |
| 5,421,696 | A | * | 6/1995 | Stephan et al. | ............. 414/751.1 |
| 5,566,436 | A | * | 10/1996 | Hirata | ............. 29/33 K |

(Continued)

FOREIGN PATENT DOCUMENTS

DE 36 41 368 A1 6/1988

(Continued)

*Primary Examiner*—Essama Omgba
(74) *Attorney, Agent, or Firm*—Laurence A. Greenberg; Werner H. Stemer; Ralph E. Locher (57) ABSTRACT

A compensating unit for a tool unit for inserting an element into a workpiece, in particular a setting unit for inserting a joining element into a workpiece. The tool unit is fastened to a mounting and being mounted, oriented in an axial direction, in such a way that, during the machining operation, a compensating movement in a plane oriented at least approximately perpendicular to the axial direction is made possible.

14 Claims, 4 Drawing Sheets

U.S. PATENT DOCUMENTS

| | | | | |
|---|---|---|---|---|
| 5,625,940 A | * | 5/1997 | Butt et al. | 29/709 |
| 5,641,265 A | * | 6/1997 | Spada et al. | 414/779 |
| 6,276,864 B1 | * | 8/2001 | Russo et al. | 403/322.1 |
| 6,932,547 B2 | * | 8/2005 | Hardesty et al. | 409/201 |
| 7,458,244 B2 | * | 12/2008 | Dehlke et al. | 72/391.6 |

FOREIGN PATENT DOCUMENTS

| | | | |
|---|---|---|---|
| GB | 2218963 A | * | 11/1989 |
| JP | 2-131892 | | 5/1990 |
| JP | 05253761 A | * | 10/1993 |
| JP | 2003-170383 | | 6/2003 |

* cited by examiner

COMPENSATING UNIT FOR A TOOL UNIT AND METHOD FOR INSERTING AN ELEMENT INTO A WORKPIECE

CROSS-REFERENCE TO RELATED APPLICATIONS

This is a continuation, under 35 U.S.C. §120, of copending international application No. PCT/EP2005/010209, filed Sep. 21, 2005, which designated the United States; this application also claims the priority, under 35 U.S.C. § 119, of German patent application Nos. DE 10 2004 061 164.5, filed Dec. 16, 2004, and DE 10 2005 023 099.7, filed May 13, 2005; the prior applications are herewith incorporated by reference in their entirety.

BACKGROUND OF THE INVENTION

Field of the Invention

The invention relates to a compensating unit for a tool unit, by which an element, for example a structural part or a joining element, can be mounted in a workpiece.

A tool unit in the present sense is understood, in particular, to mean a setting unit for the setting of, for example, blind rivets, a screwing unit for screwing in a screw element or other pressing-in or insertion units. By use of tool units of this type, the elements are introduced into receptacles/holes in the preholed workpiece. However, an automated introduction of the elements into the preholed workpiece, particularly with the aid of a robot, presents problems.

Owing to deviations in position of the tool unit on the robot or structural-part tolerances in the workpieces, undesirable deviations in the relative position between the respective element and the prepared hole may occur. Thus, for example, in motor vehicle manufacture, a plurality of preholed sheet metal parts are joined together one above the other so that the fastening holes of the sheet metal parts are in alignment with one another. However, there is the risk that the fastening holes are not optimally oriented with respect to one another. Also, the robot has an, albeit slight, inaccuracy in its approach to a learned desired position.

Undesirable deviations of this type therefore lead, in particular, to an offset of the longitudinal axis of the element with respect to the center point of the preholed hole and/or to an angular deviation of the longitudinal axis of the element from that of the preholed hole.

Deviations of this kind may considerably impair the connection quality between the element and the workpiece.

One example of use is the operation of setting a blind rivet. In the riveting operation, the blind rivet is first received by a mouthpiece of a setting unit or riveting unit and is introduced, with its rivet sleeve in front, into the rivet hole as a result of an axial advancing movement of the riveting unit, until the blind rivet lies with its setting head on the upper structural part. Subsequently, the riveting unit exerts on a rivet plug of the blind rivet a tensile force such that the rivet plug is displaced against the rivet sleeve and at the same time deforms the rivet sleeve to produce a closing head, so that the structural parts to be connected are clamped between the closing head and the setting head.

Blind rivet technology is increasingly employed particularly in the motor vehicle sector for the connection of structural parts which have hitherto been connected to one another, for example, by welding. Motor vehicle manufacturing is automated to a high degree, and the connection of the structural body parts is for the most part carried out with the aid of welding robots which automatically approach the welding points and weld the structural parts automatically to one another.

For a blind rivet connection of high quality which is also reliable over the long term, it is necessary for the blind rivet to be oriented axially parallel to a through bore into which the blind rivet is inserted for the connection of at least two structural parts. Here, however, there is the problem that, on the one hand, it is not always ensured that, for example, the drill holes of two structural parts to be connected lie exactly one above the other. As a rule, an exact positioning of the drill holes is afforded only when these are introduced during a common drilling or punching operation immediately prior to the subsequent blind rivet setting operation. When two structural parts having prefabricated drill holes are joined together, these drill holes, as a rule, have an at least slight offset. The result of this may be that, during the introduction of the blind rivet, the latter is not oriented exactly axially parallel or that its rivet head is not oriented plane-parallel to the structural part surface. Due to the forces occurring during the riveting operation, in a manual setting operation by a manually guided setting unit, the blind rivet, as a rule, is drawn positively into its axially parallel position, so that the rivet head comes to lie, flat, on the workpiece surface.

SUMMARY OF THE INVENTION

It is accordingly an object of the invention to provide a compensating unit for a tool unit and a method for inserting an element into a workpiece which overcome the above-mentioned disadvantages of the prior art devices and methods of this general type, which, in particular, is to be disposed on a robot for the automated insertion of a structural part or joining element into a preholed workpiece. The object on which the invention is based is, furthermore, to specify a method by which an automated insertion of a structural part or joining element into a preholed workpiece is made possible reliably and safely. In particular, the object on which the invention is based is to ensure a safe automated setting of a blind rivet.

The object is achieved, according to this invention, by a compensating unit for a tool unit. The tool unit itself is fastened to a mounting. The tool unit is fastened, in particular, to a robot hand via the mounting. The tool unit is oriented in an axial direction and is mounted in this direction in such a way that, during the machining operation, a compensating movement in a plane oriented perpendicular to the axial direction is made possible. Owing to this special and separate mounting of the tool unit to enable the compensating movement on the robot hand and consequently in relation to an axial direction predetermined by the mechanical fastening of the tool unit to the robot hand, an automatic self-alignment of the tool unit is made possible during the machining operation. The tool unit is in this case, in particular, a rivet setting unit, so that, by virtue of this measure, a reliable and permanent blind rivet connection between two workpieces or two structural parts can be made.

The mounting described here can be applied, in principle, to all tool units in which such a compensating movement of an x-y plane perpendicular to the axial direction is required or desirable during the machining operation.

By virtue of the configuration, the tool unit, overall, is held in the manner of an elastic mounting which, on the one hand, as required, allows a deflection out of the exact axial orientation. On the other hand, the mounting in the manner of an elastic mounting ensures that, after the setting operation, the riveting unit is transferred into its exact axial orientation again.

The compensating unit allows a safe and reliable automated insertion of elements into preholed holes in workpieces. As a result, as a particular advantage, automated reliable and safe process monitoring is made possible and is preferably also employed. For this purpose, relevant data of each individual joining operation are determined and evaluated via sensors. In the event of faults, a fault signal is transmitted. Defective connections, for example due to faults in the manual setting of a blind rivet, are thereby ruled out.

Owing to the compensating movement in a plane perpendicular to the axial direction, a self-alignment of the tool unit takes place automatically as soon as an undesirable relative deviation between the element to be inserted and the drill hole or joining hole is present. Both in the event that the longitudinal axis of the element is offset with respect to the hole center and in the event that the longitudinal axis of the element is tilted with respect to the hole axis, forces arise during the insertion of the element into the hole and bring the element into the correct position. Since a compensating movement is permitted, these forces arising are therefore utilized for the automatic self-alignment.

A particular advantage of the self-alignment is that, for example, inaccuracies in the approach of the robot to the actual hole position (offset of the longitudinal axis of the element with respect to the hole center) are compensated solely as a result of the self-alignment. There is therefore no need for any complicated follow-up of the robot and, in particular, any complicated hole location. Both of these prolong the cycle time in an undesirable way. The precondition for the self-alignment is merely that the hole and/or the element has an introduction slope or introduction chamfer, and that the element is moved exactly up to the hole at least in such a way that introduction slopes of the element and of the hole overlap one another at least partially or in such a way that the at least one introduction slope partially overlaps the hole edge or the edge of the element, so that, during an axial advancing movement, a force with a radial force component is generated on the element. Finally, the radial force component ensures the desired automatic displacement of the tool unit in an X-Y plane perpendicular to the axial direction.

Expediently, in this case, a holding element is provided, which keeps the riveting unit oriented in a defined position within the plane perpendicular to the axial direction and which, only under the action of a predetermined force, releases the riveting unit to enable the compensating movement. This configuration is based on the consideration that the tool unit, overall, is usually comparatively heavy, so that holding the tool unit in the axial orientation requires a high holding force. Furthermore, this configuration is based on the consideration that, during the machining operation, a compensating movement is to take place, as free of forces as possible, that is to say no restoring forces opposing the compensating movement act, for example, on the blind rivet.

To make the compensating movement possible, in an expedient development a compensating element is provided which is connected to the mounting. The compensating element is in this case disposed on the mounting so as to be movable in the plane perpendicular to the axial direction and, in particular, is a sliding element, for example a sliding plate, which can slide freely between two guides of the mounting, in particular within predefined limits.

Expediently, the tool unit is connected to the compensating element via a bearing, that is to say the tool unit itself is held on the compensating element via the bearing. The bearing is in this case configured in such a way that a tilting movement of the tool unit with respect to the axial direction is made possible. The compensating element itself does not execute any tilting movement for the compensating movement.

With a view to locking in the axial direction, the holding element expediently engages into the compensating element, specifically, in particular, in the axial direction with a holding force acting in the axial direction.

This is in this case expediently exerted by a spring element.

According to a preferred development, a return device is provided which brings the compensating element into its position of rest or initial position again after a compensating movement has taken place. The return movement in this case occurs, in particular, automatically, as soon as the setting operation is ended and the force which acts on the tool unit and has caused the compensating movement lapses again.

Expediently, in this case, the return device contains the holding element. This therefore has a double function, to be precise, on the one hand, it keeps the compensating element in its initial position and, on the other hand, as required, returns it into the initial position again.

On account of the compensating element displaceable in the x-y plane and the holding element oriented in the axial direction, a radial force is exerted on the latter via the compensating element insofar as a compensating movement is required. In order here to allow an automatic release and also return of the compensating element, the holding element is expediently configured with a spherical or conical tip. The latter preferably engages into a complementary spherical or conical receptacle in the compensating element. By virtue of the conical or oblique configuration, when a radial force is exerted on the holding element, a force component acting in the axial direction is generated which automatically forces the holding element back, counter to the elastic restoring force exerted via the spring element, so that the lock is released. Conversely, as a result of this configuration, an automatic return is achieved, insofar as the holding element is pressed into the receptacle again by an external force.

For the return after the setting operation, the tool unit has to be brought into the exact axial orientation again, so as to have a defined initial position for the next setting operation. On account of the comparatively high weight of the tool unit, a comparatively high return force is required for this purpose. According to an expedient development, there is provision for the holding element to be connected to a pressure unit, via which a pressure force acting in the direction of the compensating element can be exerted on the holding element. The holding element is therefore displaced toward the compensating element by the pressure force. Owing to the conical configuration, an automatic return of the compensating element into the initial position takes place in this case. The tool unit is thus returned into the axial direction. In order to allow this automatic return, in this case the sliding movement of the compensating element is expediently limited in such a way that the mutually corresponding conical surfaces of the compensating plate and of the holding element also overlap one another in the radial direction so that the restoring force can be exerted.

With a view to as compact a construction as possible, the mounting is configured at the same time as an advancing unit which enables an advancing movement of the tool unit in the axial direction. The mounting therefore moves in the axial direction and at the same time displaces the compensating plate and, with the latter, the tool unit in the axial direction.

The object relating to the method is achieved, according to the invention, by a method. The features, preferred developments and functions listed with regard to the compensating unit are to be transferred accordingly to the method.

Other features which are considered as characteristic for the invention are set forth in the appended claims.

Although the invention is illustrated and described herein as embodied in a compensating unit for a tool unit and a method for inserting an element into a workpiece, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Identically acting parts are given the same reference symbols in the figures. Referring now to the figures of the drawing in detail and first, particularly, to FIG. 1 thereof, there is shown as a machine tool, a blind rivet setting device 2 that is disposed as an angled robot arm 3 on a multiaxial industrial robot 4. The setting device 2 is in this case fastened exchangeably via flanges 5A, 5B to what is known as a sixth axis of the six-axis industrial robot 4. The setting device 2 contains a setting or riveting unit 6, a rivet feed unit 8, a hydraulic unit 10 and a hole detection unit 12. In the configuration variant according to FIG. 2, a repositioning unit 14 for a fine positioning of the riveting unit 6 within an X-Y plane which spans perpendicular to an axial direction 16 is additionally provided. The setting device 2 is, overall, a mechanically rigid structure. Only the riveting unit 6 is disposed so as to be movable within certain limits. The industrial robot 4 with the setting device 2 is suitable for the fully automatic setting of a blind rivet 18. To feed the blind rivet 18 to the rivet feed unit 8 according to FIG. 1, a supply unit 20 for the supply and feed of the rivets 18 into a hose is provided. Via the hose, blind rivets 18 are individually shot in pneumatically, for example from a separating station, not illustrated in any more detail here. Furthermore, in the exemplary embodiment, the riveting unit 6 is connected on its rear side to a further hose which is part of a residual plug discharge unit 22 and via which a residual plug occurring during the setting operation is sucked away.

Figure 1:
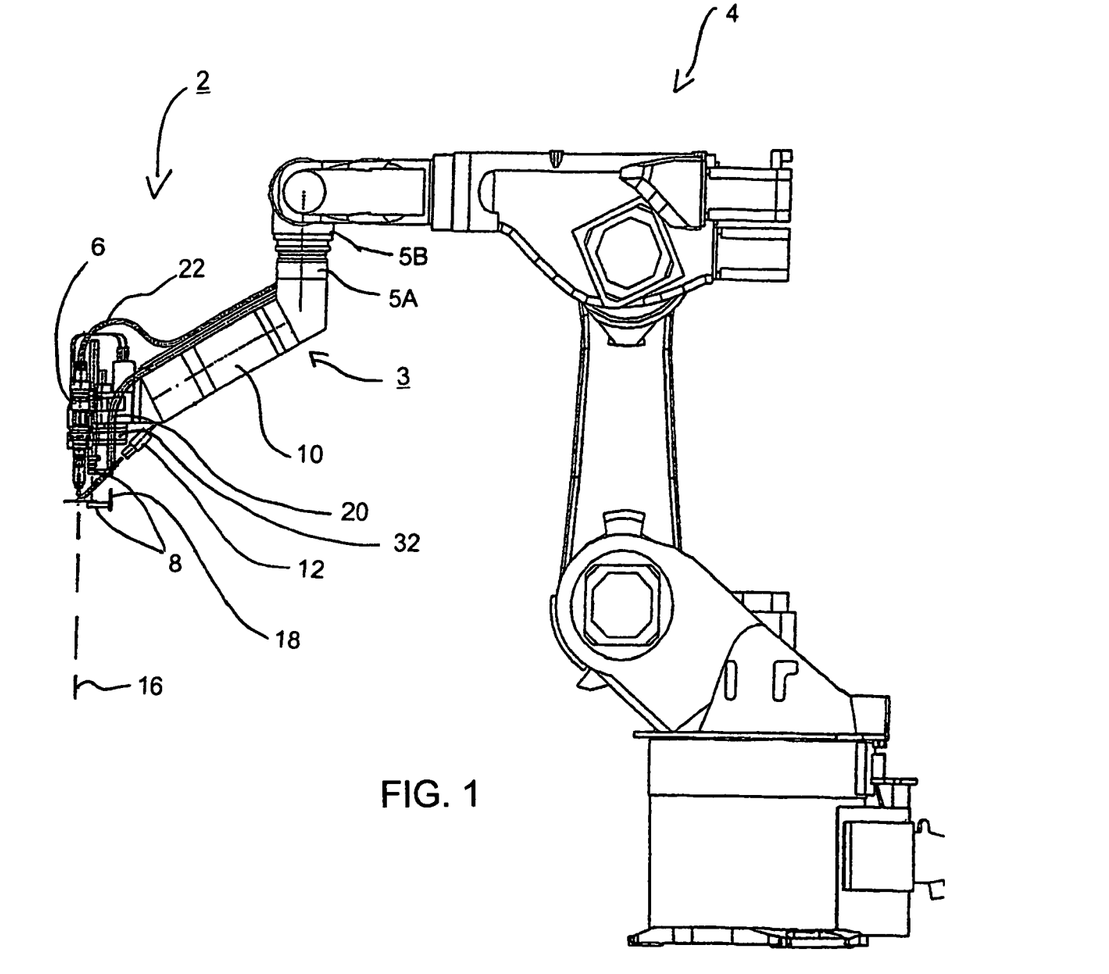
FIG. 1 is a diagrammatic, side view of an industrial robot, a robot arm of which is formed as a machine tool configured as a blind rivet setting device according to the invention.

For the automatic setting operation, the blind rivet 18 is first fed via the supply unit 20 to a gripping element 24 of the rivet feed unit 8 and is caught by the gripping element 24. The gripping element 24 is subsequently moved forward in the axial direction 16, and a rotational movement about an axis of rotation 26 oriented parallel to the axial direction 16 subsequently takes place, so that the blind rivet 18 is positioned in front of a mouthpiece 28 of the riveting unit 6. The gripping element 24 is subsequently displaced back in the axial direction 16 again, and the blind rivet 18 is introduced, with its rivet plug in front, into the mouthpiece 28. Thereafter, the gripping element 24 is rotated away again, and the riveting unit 6 is advanced in the axial direction 16 to a workpiece 30, illustrated diagrammatically here merely as a line. In this case, the blind rivet 18 is inserted, with its shank in front, into a rivet hole 29 (cf. FIG. 3) which is configured as a through bore through at least two workpieces 30 to be connected. The blind rivet 18 is inserted until it lies with its setting head on a workpiece surface. Subsequently, the rivet plug located in the mouthpiece 28 and firmly surrounded by the riveting unit 6 is drawn rearward in the axial direction 16 with the aid of a hydraulic drive. For this purpose, the riveting unit 6 is connected to the hydraulic unit 10 by hydraulic lines, not illustrated in any more detail here. In this case, a closing head is formed on that side of the blind rivet 18 which faces away from the setting head, so that the two workpieces 30 are firmly connected to one another. As soon as a predetermined tensile force is overshot, the rivet plug tears off and is sucked away as a residual plug via the residual plug discharge unit 22. Subsequently, the riveting unit 6 moves back again and is moved to the next learned desired position by the industrial robot 4, in order to carry out the next setting operation.

Figure 2:
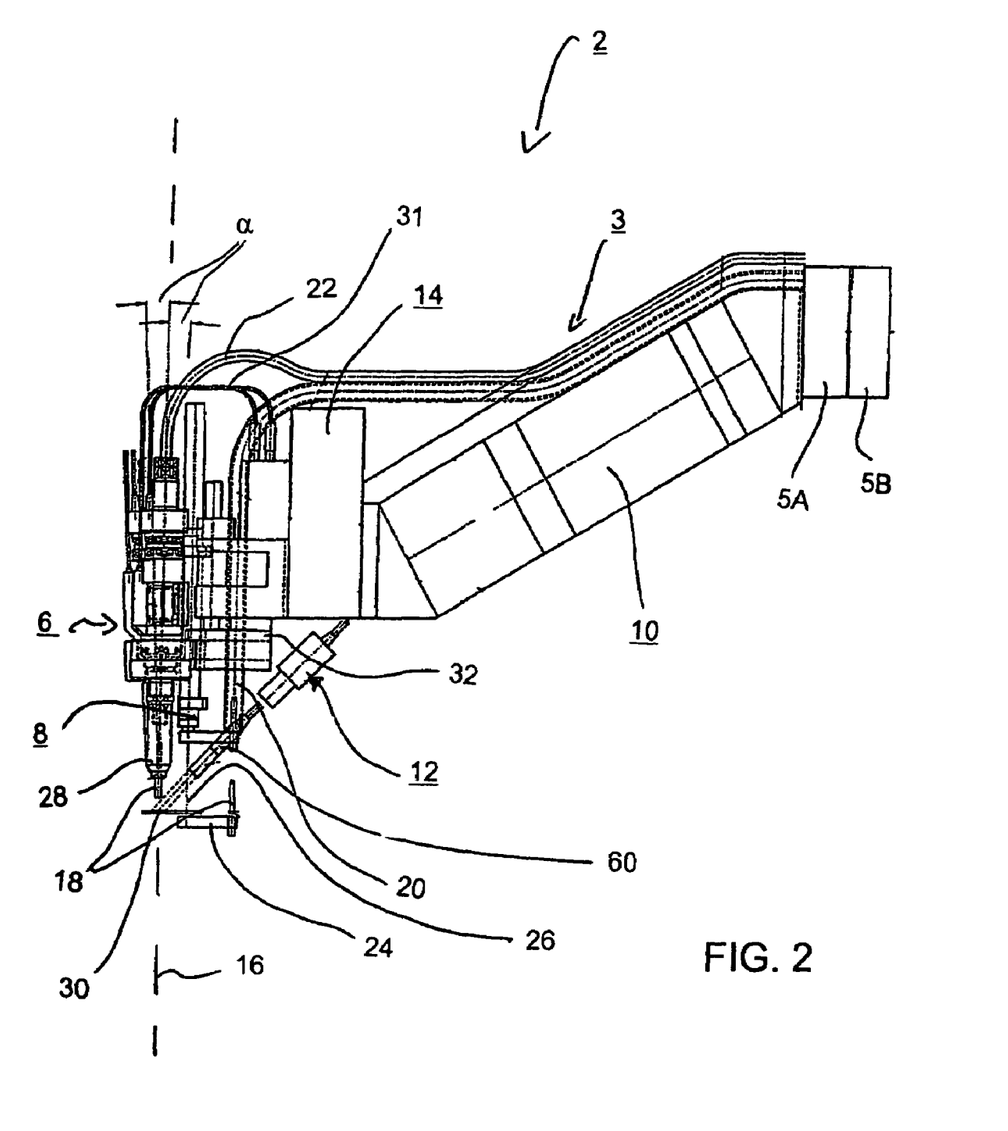
FIG. 2 is a diagrammatic, side view of a second embodiment of the blind rivet setting device.

For a setting operation of high quality, it is necessary that the blind rivet 18 is oriented exactly with the hole 29 and that the setting head lies flat on the workpiece surface. If the robot 4 does not approach the hole 29 exactly, with the result that the blind rivet 18 is disposed eccentrically to the hole 29, a longitudinal axis of the blind rivet 18 still has to be aligned centrically with the hole 29, that is to say the blind rivet 18 still has to be displaced laterally. If the longitudinal axis of the blind rivet 18 is tilted, that is to say is not aligned parallel to the hole axis, the blind rivet 18 has to be aligned axially parallel in order to ensure that it lies flat on the workpiece 30. In this case, therefore, it is necessary that the riveting unit 6, overall, executes a tilting movement about the axial direction 16. This is illustrated in FIG. 2 in that the riveting unit 6 is illustrated, on the one hand, in exact axial alignment and, on the other hand, offset at a tilt angle $\alpha$. The tilt angle $\alpha$ is in this case, for example, 3°. The tilting movement is in this case executed only by the riveting unit 6. The remaining components of the setting unit 2 are disposed fixedly. Overall, therefore, the riveting unit 6 is mounted or held on a mounting 32 in the manner of an elastic mounting.

Both the lateral displacement and the axially parallel alignment by a tilting movement are made possible automatically, during the setting of the blind rivet, solely by the forces occurring during the setting operation and due to the compensating unit described in detail below.

Figure 3:
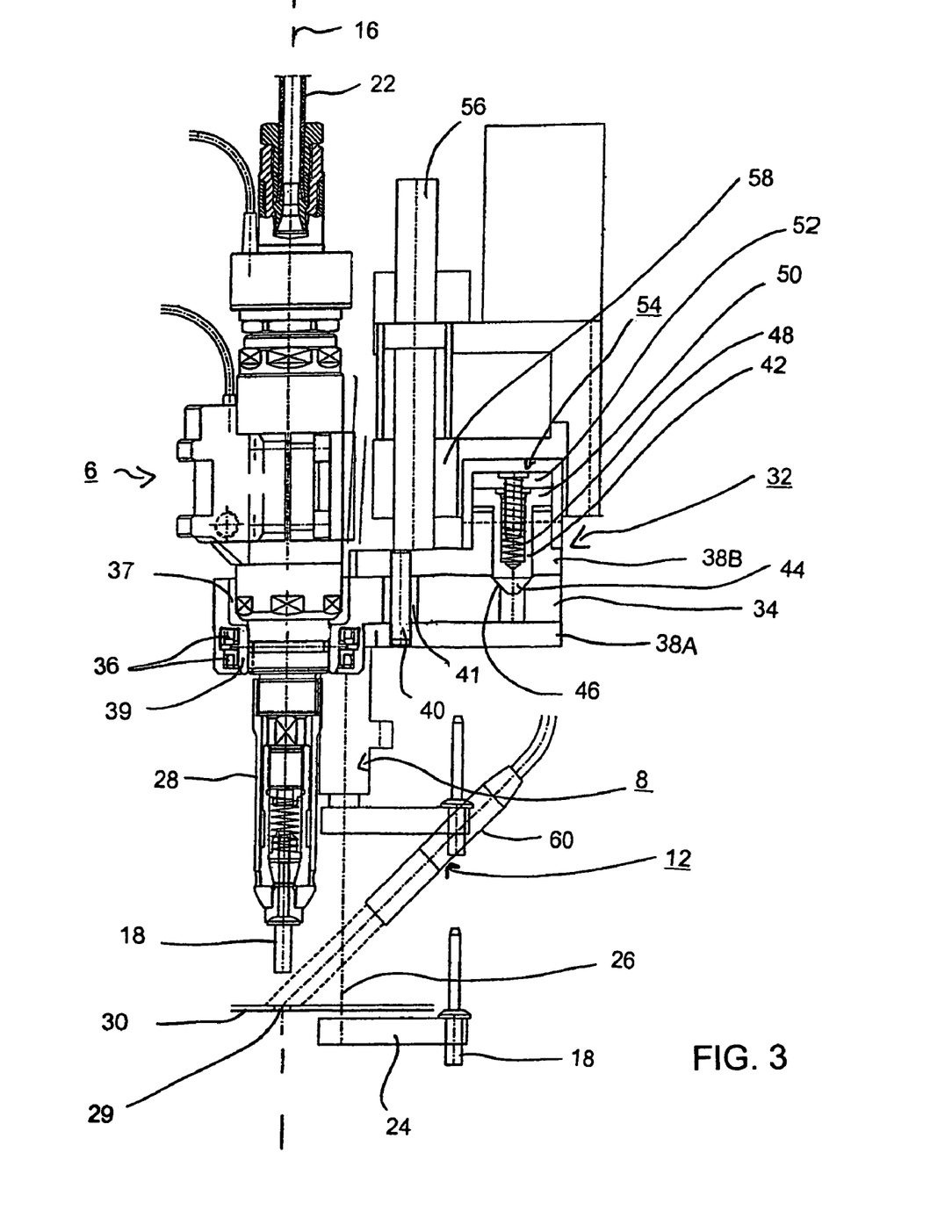
FIG. 3 is a diagrammatic, partial sectional side view of a riveting unit.
Figure 4:
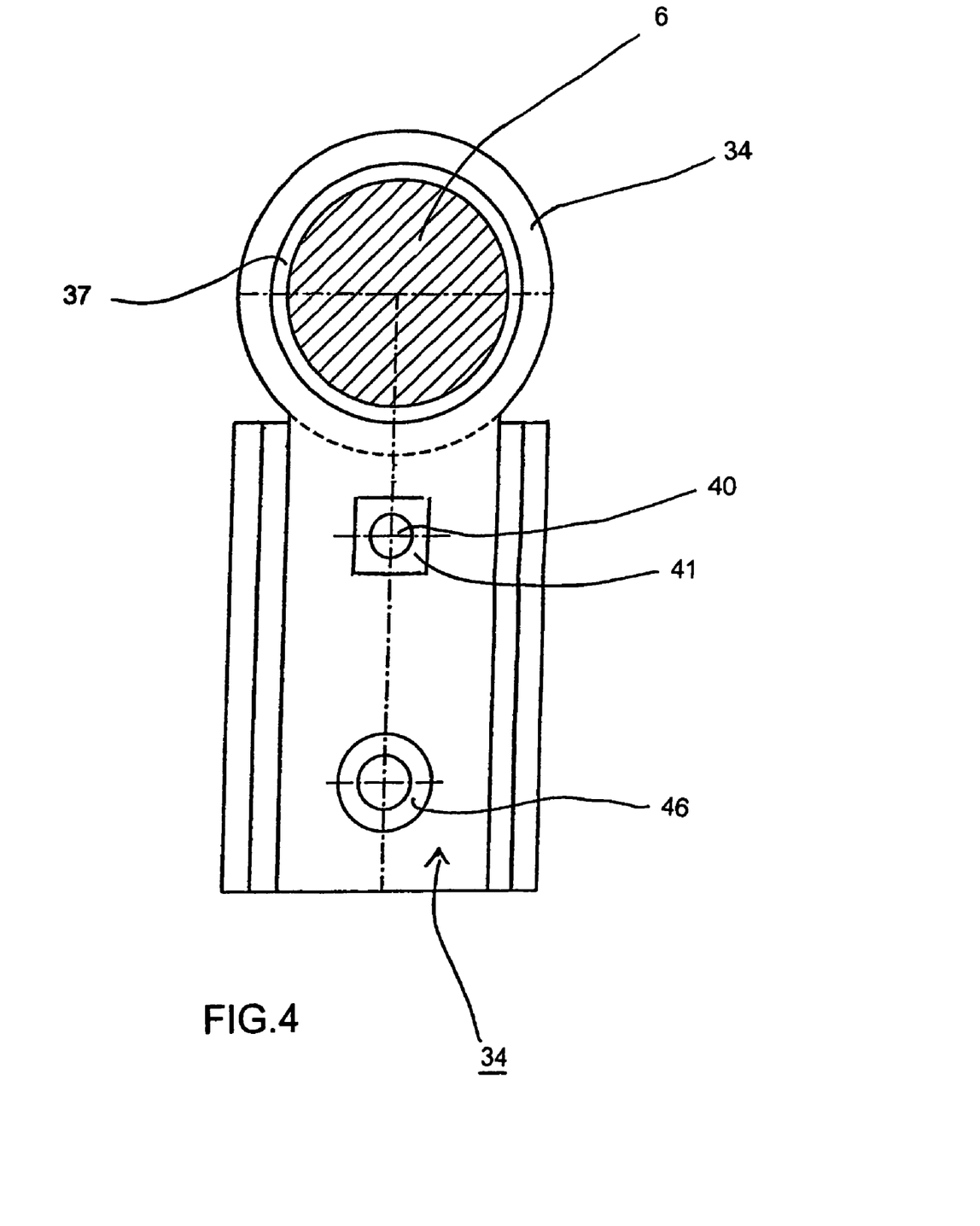
FIG. 4 is a diagrammatic, top view of a compensating element configured as a sliding plate.

The configuration and method of operation of the compensating unit for allowing the compensating movement may be gathered from FIG. 3 and FIG. 4. The riveting unit 6 is fastened to a compensating element 34, configured as a sliding plate 34, via a bearing 36 configured as a pendulum or pivot bearing. The bearing 36 allows the tilting movement about the axial direction 16 and consequently also in relation to the sliding plate 34. The sliding plate 34 itself is held displaceably perpendicular to the axial direction 16 in the X-Y plane between two guide walls 38A, 38B of the mounting 32. The sliding plate 34 can slide in the plane perpendicular to the axial direction 16 within predetermined limits between the two guide walls 38A, 38B. The sliding plate 34, in the bearing region, surrounds the riveting unit 6 annularly, so as to leave a gap 37. The riveting unit 6 is held in the compensating unit with the aid of a holding ring 39. The riveting unit 6 is therefore disposed in a pot-like receptacle of the sliding plate 34. The sliding plate 34 is connected to the holding ring 39 via the bearing 36. A tilting movement of the riveting unit 6 is made possible by the gap 37 with respect to the sliding plate 34 movable only in the X-Y direction. The two guide walls 38A, 38B are firmly connected to one another, spaced apart, via a bolt 40. The bolt 40 is led with sufficient play through the sliding plate 34 through a clearance 41 in the latter.

In a lower region, a holding element 42 is led through the right guide wall 38B and engages with a frustoconical tip 44 into a conical receptacle 46 in the sliding plate 34. Alternatively to the cone-like configuration, a sphere-like configuration is provided. The holding element 42 is pressed into the receptacle 46 by a spring force. The holding element 42 therefore snaps in the manner of a latching element into the receptacle 46. For this purpose, a spring element 48 is provided which exerts a spring force in the axial direction 16 on the holding element 42. The prestress of the spring element 48 is adjustable. On its rear side facing away from the receptacle 46, the holding element 42 has a disk-shaped pressure plate 50. The holding element 42 is therefore configured, overall, in the manner of a pressure piston which has the tip 44 on its front side. The pressure plate 50 is mounted slideably within a pressure unit 54 configured in the manner of a pressure cylinder and having a pressure space 52. The pressure space 52 is connected in a way not illustrated in any more detail here to a compressed air line and can be acted upon, as required, with compressed air.

Owing to the interaction of the individual structural parts, to be precise the guide walls 38A, 38B, the sliding plate 34, the holding element 42, the bearings 36 and the pressure unit 54, the compensating unit allowing the compensating movement is afforded. This is configured as a unitary component and has a common housing for the individual structural parts. In particular, the guide walls 38A, 38B are housing walls.

If the blind rivet 18 is not disposed axially parallel to the rivet hole during the setting operation, that is to say if the setting head does not lie flat on the surface of the workpiece 30, the blind rivet 18 will attempt, due to the forces occurring during setting, to align itself axially parallel with the rivet hole 29. Via the blind rivet 18, therefore, a force is exerted on the mouthpiece 28 and consequently on the riveting unit 6. The result of this force, then, is that the riveting unit 6 exerts on the sliding plate 34 a force in the direction perpendicular to the axial direction 16. This force oriented radially to the axial direction 16 is transmitted to the holding element 42. Owing to the conical configuration of the receptacle 46 and of the tip 44, a resultant force arises in the axial direction 16 and presses the holding element 42 rearward counter to the spring force of the spring element 48, so that the sliding plate 34 is displaceable in the X-Y plane. The spring force and the cone angle are in this case selected, in particular, such that the sliding plate 34 is released, for example, in the event of a torque above 10 Nm.

After the setting operation, the riveting unit 6 has to be transferred again into the orientation in the axial direction 16. In order to ensure this return reliably, the pressure plate 50 is acted upon with pressure, so that the tip 44 is pressed into the receptacle 46 again. The sliding plate 34 is therefore drawn back into its original position again.

As may be gathered, furthermore, from FIG. 3, the mounting 32 serves at the same time as an advancing unit for advancing the riveting unit 6 in the axial direction 16. For this purpose, the mounting 32 contains a guide rod 56 which is held in a slide guide 58 and is displaceable hydraulically in the axial direction 16. The guide rod 56 is in this case firmly connected mechanically to the right guide wall 38B and acts on the latter. The housing of the pressure unit 54 is connected, furthermore, to the right guide wall 38B and is therefore co-moved with the guide wall 38B. Thus, the unit is formed of the two guide walls 38A, 38B, of the sliding plate 34 and of the pressure unit 54 is displaced in the axial direction 16 via the guide rod 56.

FIG. 3 illustrates, furthermore, a combined laser/camera unit 60 which, oriented obliquely to the axial direction 16, is fastened to the setting unit 2 in a way not illustrated in any more detail here. The unit 60 has as light source a laser and also an optical camera, which are not illustrated in detail here. The hole detection unit 12 is expedient particularly in connection with the arrangement of the repositioning unit 14. A particular advantage of the compensating unit described here is to be seen in that repositioning and hole location may be dispensed with. Preferably, therefore, these two components are not provided when the compensating unit is implemented.

Moreover, the gripping element 24 is illustrated in the retracted position and in the front drawn-out position in FIG. 3. The blind rivet 18 is brought out of the front drawn-out position, also designated as a rotary position, in front of the mouthpiece 28 by a rotational movement about the axis of rotation 26.

The invention claimed is:

1. A compensating unit for a tool unit for inserting an element into a workpiece, the compensating unit comprising:
   a mounting for fastening the tool unit and the tool unit being mounted, oriented in an axial direction, such that, during a machining operation, a compensating movement in a plane oriented at least approximately perpendicular to the axial direction is made possible;
   a compensating element, the tool unit being connected to said mounting via said compensating element, said compensating element including a sliding plate disposed on said mounting so as to be laterally movable in the plane perpendicular to the axial direction;
   a bearing, the tool unit being connected to said sliding plate via said bearing which allows a tilting movement with respect to the axial direction; and
   said sliding plate surrounding the tool unit annularly in a region of said bearing and leaving a gap such that the tool unit is disposed in a pot-like receptacle of the sliding plate.

2. The compensating unit according to claim 1, further comprising a holding element for keeping the tool unit oriented in a defined position within the plane perpendicular to the axial direction and which, under an action of a predetermined force, releases the tool unit to enable the compensating movement.

3. The compensating unit according to claim 2, wherein said holding element engages into said compensating element with a holding force acting in the axial direction.

4. The compensating unit according to claim 3, further comprising a spring element exerting the holding force.

5. The compensating unit according to claim 3, further including:
   a return device exerting on said compensating element a return force in the plane perpendicular to the axial direction to return said compensating element into an initial position;
   said return device including said holding element;
   a pressure unit connected to said holding element to exert a pressure force acting in a direction of said compensating element on said holding element; and
   said holding element having a conical tip engaging into a complementary conical receptacle formed in said compensating element, the sliding movement of the compensating element being limited in such a way that the mutually corresponding conical surfaces of said compensating element and said holding element also overlap one another in a radial direction to exert the return force.

6. The compensating unit according to claim 2, further comprising a return device exerting on said compensating element a return force in the plane perpendicular to the axial direction to return said compensating element into an initial position.

7. The compensating unit according to claim 6, wherein said return device includes said holding element.

8. The compensating unit according to claim 2, wherein:
said compensating element has a complementary conical receptacle formed therein; and
said holding element has a conical tip engaging into said complementary conical receptacle in said compensating element.

9. The compensating unit according to claim 2, further comprising a pressure unit connected to said holding element, and via said pressure unit a pressure force acting in a direction of said compensating element can be exerted on said holding element.

10. The compensating unit according to claim 1, wherein said mounting is an advancing unit enabling an advancing movement in the axial direction.

11. A method for an automated insertion of an element into a preholed hole in a workpiece with an aid of a tool unit, which comprises the steps of:
moving the tool unit automatically up to a hole position of the preholed hole;
inserting the element into the hole, while, in an event of a deviation in position between the element and the hole, performing a compensating movement of the tool unit automatically, using the compensating unit of claim 1, in a plane at least approximately perpendicular to an axial direction of the tool unit by virtue of a force generated due to a deviation in position during the inserting of the element.

12. The method according to claim 11, which further comprises moving the tool unit up to the hole with an aid of a robot.

13. The method according to claim 11, which further comprises providing the tool unit as a rivet setting unit for inserting a blind rivet, as the element, into a rivet hole.

14. A compensating unit for a setting unit for inserting a joining element into a workpiece, the compensating unit comprising:
a mounting for fastening the setting unit and the setting unit being mounted, oriented in an axial direction, such that, during a machining operation, a compensating movement in a plane oriented at least approximately perpendicular to the axial direction is made possible;
a compensating element, the setting unit being connected to said mounting via said compensating element, said compensating element including a sliding plate disposed on said mounting so as to be laterally movable in the plane perpendicular to the axial direction;
a bearing, the setting unit being connected to said sliding plate via said bearing which allows a tilting movement with respect to the axial direction; and
said sliding plate surrounding the setting unit annularly in a region of said bearing and leaving a gap such that the setting unit is disposed in a pot-like receptacle of the sliding plate.

\* \* \* \* \*